(12) United States Patent
Kashihara et al.

(10) Patent No.: US 6,671,433 B2
(45) Date of Patent: Dec. 30, 2003

(54) ARRAYED WAVEGUIDE GRATING TYPE OPTICAL MULTIPLEXER/DEMULTIPLEXER

(75) Inventors: Kazuhisa Kashihara, Chiyoda-ku (JP); Kazutaka Nara, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 141 days.

(21) Appl. No.: 09/836,354

(22) Filed: Apr. 18, 2001

(65) Prior Publication Data

US 2002/0015559 A1 Feb. 7, 2002

(30) Foreign Application Priority Data

Apr. 18, 2000 (JP) .................... 2000-116089
Mar. 30, 2001 (JP) .................... 2001-100480

(51) Int. Cl.⁷ ............................... G02B 6/34
(52) U.S. Cl. .................. 385/37; 385/14; 385/129; 385/130; 385/131
(58) Field of Search ............ 385/14, 129, 130, 385/131

(56) References Cited

U.S. PATENT DOCUMENTS

| | | | | |
|---|---|---|---|---|
| 5,136,671 A | * | 8/1992 | Dragone | 385/17 |
| 5,546,483 A | * | 8/1996 | Inoue et al. | 359/110 |
| 5,629,992 A | | 5/1997 | Amersfoort et al. | |
| 5,748,811 A | * | 5/1998 | Amersfoort et al. | 385/15 |
| 5,889,906 A | * | 3/1999 | Chen | 359/115 |

FOREIGN PATENT DOCUMENTS

JP  8-122557  5/1996
JP  9-297228  11/1997

* cited by examiner

Primary Examiner—Robert H. Kim
Assistant Examiner—Richard Kim
(74) Attorney, Agent, or Firm—Oblon, Spivak, McClelland, Maier & Neustadt, P.C.

(57) ABSTRACT

An arrayed waveguide grating type optical multiplexer/demultiplexer according to the present invention multiplexes or demultiplexes the lights of desired wavelength without depending on the outside environmental temperature thereby realizing a high quality optical wavelength division multiplexing communications. A waveguide forming part 10 comprising connecting in series of one or more optical input waveguides 12, a first slab waveguide 13, an arrayed waveguide 14 consisted of a plurality of channel waveguides 14a arranged side by side with a length different from each other, a second slab waveguide 15 and a plurality of optical output waveguides 16 arranged side by side is formed on a substrate 11. At the output ends of one or more optical input waveguides 12 is provided, for example, a trapezoidal type waveguide 5. The trapezoidal type waveguide 5 is formed by providing a width larger than that of the optical input waveguide or the optical output waveguide to be connected and enlarging its width increasingly toward the corresponding slab waveguide. The optical multiplex/demultiplex function of the arrayed waveguide grating type optical multiplexer/demultiplexer is designed by a optical frequency spacing of 100 GHz and a light which has undergone wavelength division multiplexing having, for example, an optical frequency spacing of 200 GHz is outputted to be demultiplexed.

6 Claims, 8 Drawing Sheets

ARRAYED WAVEGUIDE GRATING TYPE OPTICAL MULTIPLEXER/DEMULTIPLEXER

FIELD OF THE INVENTION

The present invention relates to an arrayed waveguide grating type optical multiplexer/demultiplexer used in at least either one of the optical multiplexer, the optical demultiplexer or the optical multiplexer/demultiplexer.

BACKGROUND OF THE INVENTION

In recent years, in the field of optical communications, research and development in wavelength division multiplexing (WDM) transmission systems as a method for increasing the transmission capacity drastically has been actively pursued and the practical application is now advancing. The wavelength division multiplexing transmission systems performs wavelength division multiplexing for transmission, for example, a plurality of lights each having a different wavelength from each other. In such wavelength division multiplexing transmission systems, an optical multiplexer/demultiplexer is required for demultiplexing a plurality of lights each having a different wavelength from each other from the light which has undergone wavelength division multiplexing or for multiplexing a plurality of lights each having a different wavelength from each other.

As an example of the optical multiplexer/demultiplexer, an arrayed waveguide grating (AWG) type optical multiplexer/demultiplexer is known. The arrayed waveguide grating type optical multiplexer/demultiplexer is composed by forming on a substrate 11 an optical waveguide unit 10 having a waveguide such as shown for example in FIG. 7A.

The waveguide construction of the arrayed waveguide grating type optical multiplexer/demultiplexer comprises one or more optical input waveguides 12 arranged side by side, a first slab waveguide 13 connected to the output ends of the optical input waveguides 12, an arrayed waveguide 14 connected to the output end of the first slab waveguide 13, a second slab waveguide 15 connected to the output end of the arrayed waveguide 14, a plurality of optical output waveguides 16 connected to the output end of the second slab waveguide 15 arranged side by side. And the arrayed waveguide 14 consists of a plurality of channel waveguides 14a arranged side by side.

Each of the aforementioned channel waveguides 14a, which propagates the light outputted from the first slab waveguide 13, is formed of a predetermined different length from each other.

The optical input waveguide 12 or the optical output waveguide 16 is, for example, provided corresponding to the number of the signal lights each having a different wavelength from each other, for example, demultiplexed by arrayed waveguide grating type optical multiplexer/demultiplexer. The channel waveguides 14a are generally provided so many as for example 100 waveguides. But for the purpose of simple illustration the number of the waveguides of each waveguide 12, 14a, 16 is shown informally in FIG. 7A. In addition, the arrayed waveguide grating type optical multiplexer/demultiplexer is formed approximately symmetrical with respect to the broken line C in the drawing.

FIG. 7B shows the enlarged schematic view within the frame A depicted by dotted line in FIG. 7A. As shown in this figure, in the conventional arrayed waveguide grating type optical multiplexer/demultiplexer, the output ends of the optical input waveguides 12 of a rather curved shapes are directly connected to the input side of the first slab waveguide 13. In addition, the input ends of the optical output waveguides 16 of rather curved shapes are directly connected to the output side of the second slab waveguide 15 likewise.

The optical input waveguides 12 are, for example, connected to the optical fibers of the transmitting side so that the light which has undergone wavelength division multiplexing can be introduced therein. The light introduced to the first slab waveguide 13 through one of the optical input waveguides 12 is diffracted by means of the diffraction effect, inputs into each of the plurality of channel waveguids 14a and propagates through the arrayed waveguide 14.

The light propagating through the arrayed waveguide 14 reaches the second slab waveguide 15 and further condensed into the optical output waveguide 16 thereby being outputted. As the length of each channel waveguide 14a differs with each other by a predetermined length, a phase shift is generated in each light after having propagated through each channel waveguide 14a and so the phasefront of the lights inclines corresponding to the predetermined length. As the condensing position of the light is determined in accordance with the angle of the inclination, the condensing position of the light having different wavelength differs with each other. Hence, by forming the optical output waveguide 16 at the condensing position of the light of each wavelength, it is made possible to output lights each having a different wavelength from each other by a predetermined design wavelength spacing from the respective optical output waveguide 16 corresponding to each wavelength.

For example as shown in FIG. 7A, when the light which has undergone wavelength division multiplexing having a different wavelength $\lambda 1, \lambda 2, \lambda 3 \ldots \lambda n$ (n is a integer more than 1) from each other by a predetermined design wavelength spacing is inputted from one optical input waveguide 12, the light is diffracted by the first slab waveguide 13 and reaches the arrayed waveguide 14. Then, it propagates further through the arrayed waveguide 14 and slab waveguide 15 and condenses as described above to the different positions depending on their wavelengths thereby the lights having the different wavelengths input into the optical output waveguides 16 respectively. Further, they propagate through the respective optical output waveguides 16 and outputted from output end of the optical output waveguides 16. By connecting an optical fibers to the output ends of each optical output waveguide 16, the aforementioned lights of each wavelength can be taken out through the optical fiber.

In addition, as the arrayed waveguide grating makes use of the light reciprocal (reversibility) principle, it has not only a function as an optical demultiplexer but also has a function as an optical multiplexer. In other words, in case of inputting a plurality of different lights each having a different wavelength from each other by a predetermined wavelength from respective optical output waveguide 16 corresponding to each wavelength, to the contrary as shown in FIG. 7A, these lights are multiplexed through the propagating path reverse to the aforementioned path so that a light having the different wavelengths is outputted from the single optical input waveguide 12.

In this arrayed waveguide grating type optical multiplexer/demultiplexer, the improvement in the wavelength resolution of the arrayed waveguide grating is proportional to the different length ($\Delta L$) between the adjacent channel waveguides 14a composing the arrayed waveguide grating. Consequently, by designing ΔL a greater value, an optical multiplex/demultiplex of a light which has undergone wavelength division multiplexing having a narrow wavelength spacing becomes possible which the conventional optical multiplexer/demultiplexer could hardly realize. For example, by designing ΔL a greater value thereby the design wavelength spacing for multiplexing or demultiplexing equals to or less than 1 nm, a multiplex/demultiplex function of a plurality of light signals having a wavelength spacing of 1 nm or less can be achieved so that the optical multiplex/demultiplex function of a plurality of lights required for the realization of a high density wavelength division multiplexing communications can be accomplished.

SUMMARY OF THE INVENTION

The arrayed waveguide grating type optical multiplexer/demultiplexer according to the present invention comprises one or more optical input waveguide arranged side by side, a first slab waveguide connected to the output ends of the optical input waveguides, an arrayed waveguide connected to the output end of the first slab waveguide and consisted of a plurality of channel waveguides arranged side by side each having a different length from each other by a predetermined size, a second slab waveguide connected to the output end of the arrayed waveguide, a plurality of optical output waveguides arranged side by side connected to the output end of the second slab waveguide. This arrayed waveguide grating type optical multiplexer/demultiplexer has a demultiplex function to demultiplex the light having a plurality of wavelengths different from each other by a predetermined design wavelength spacing into a plurality of lights each having a different wavelength from each other, and a multiplex function to multiplex a plurality of lights each having a wavelengths different from each other by said predetermined design wavelength spacing, and during optical demultiplexing, a light having a plurality of different wavelengths from each other, an integral multiple spacing of said predetermined design wavelength spacing, is inputted into the optical input waveguide of the arrayed waveguide grating type optical multiplexer/demultiplexer and a plurality of lights each having a wavelength different from each other are demultiplexed to be outputted from the optical output waveguide side, and during optical multiplexing, lights each having a different wavelength from each other by a wavelength spacing, an integral multiple spacing of said predetermined design wavelength spacing are inputted into the optical output waveguides of the arrayed waveguide grating type optical multiplexer/demultiplexer and the light of each wavelength is multiplexed to be outputted from the optical input waveguide side, wherein an approximately rectangular optical amplitude distribution forming waveguide is connected between at least either one of one or more optical input waveguides and one or more optical output waveguides and a slab waveguide as the connection couple, and the approximately rectangular optical amplitude distribution forming waveguide changes the optical amplitude distribution of the light propagating from the optical input waveguide side or the optical output waveguide side to the corresponding slab waveguide side from a Gaussian shape to an approximately rectangular shape.

BRIEF DESCRIPTION OF THE DRAWINGS

Exemply embodiments of the invention will now be described in conjunction with drawings, in which.

DETAILED DESCRIPTION

Generally, as for the arrayed waveguide grating type optical multiplexer/demultiplexer, the transmitting wavelength of the light (wavelength of the light demultiplexed or multiplexed) varies greatly in accordance with the change in the outside environmental temperature. Therefore, in case that the outside environmental temperature having changed, lights of desired wavelength can not be multiplexed or demultiplexed correctly by means of the arrayed waveguide grating type optical multiplexer/demultiplexer.

Hence, in the prior art, by employing Peltier device or the like for temperature control to keep the temperature of the arrayed waveguide grating type optical multiplexer/demultiplexer, the wavelength shift of the transmitting light due to the change in the aforementioned outside environmental temperature is reduced. However, in the arrayed waveguide grating type optical multiplexer/demultiplexer of this type, because of providing the Peltier device and the temperature control circuit thereof, there is a problem that the manufacturing cost of the arrayed waveguide grating type optical multiplexer/demultiplexer increases and moreover the electricity is required for the temperature control.

Therefore, it is expected to realize the multiplexing or demultiplexing lights of desired wavelength by means of the arrayed waveguide grating type optical multiplexer/demultiplexer with stability without depending on the outside environmental temperature.

In addition, for performing high quality communications during the wavelength division multiplexing communications with the use of the arrayed waveguide grating type optical multiplexer/demultiplexer, it is counted as one of the substantial problems to improve the crosstalk at the range of the adjacent transmitting wavelength (hereinafter referred to as adjacent crosstalk).

The present invention provides a arrayed waveguide grating type optical multiplexer/demultiplexer capable of multiplexing/demultiplexing lights of desired wavelength with stability and improving the adjacent crosstalk of the arrayed waveguide grating type optical multiplexer/demultiplexer thereby realizing a high quality wavelength division multiplexing communications.

According to an example of the present invention, the arrayed waveguide grating type optical multiplexer/demultiplexer has, for example, an optical demultiplex function to demultiplex lights each having a different wavelength (for example, $\lambda 1, \lambda 2, \lambda 3 \ldots \lambda n$) from each other from the light having a plurality of different wavelengths from each other by a predetermined design wavelength spacing inputted from the optical input waveguide thereby outputting them from each optical output waveguide.

Figure 8A:
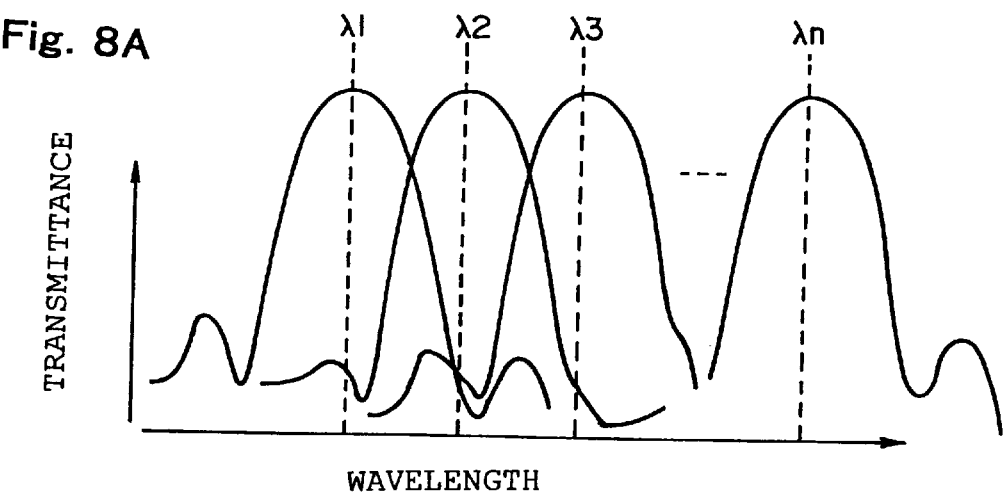
FIGS. 8A, 8B and 8C are graphs each showing in a condition for comparing the light transmitting characteristics of the light of each wavelength in the arrayed waveguide grating type optical multiplexer/demultiplexer.
Figure 8B:
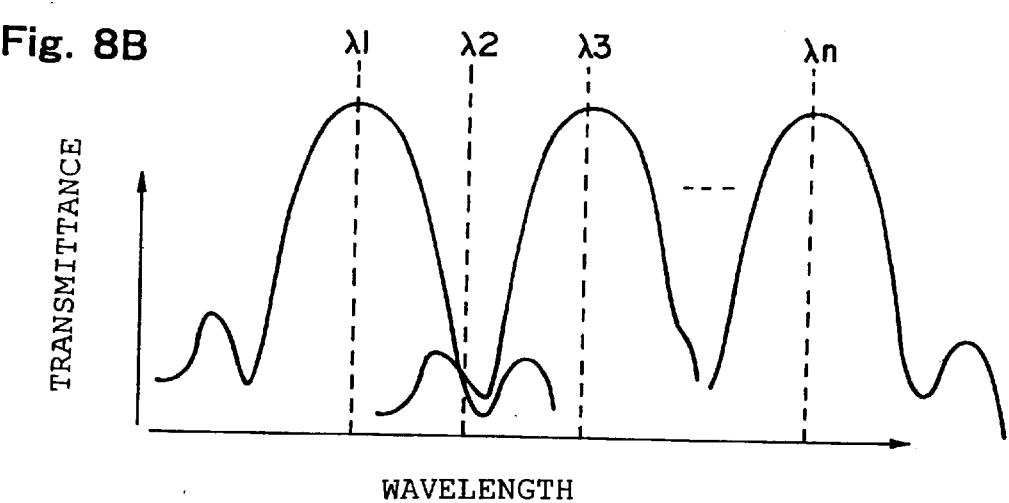
Figure 8C:
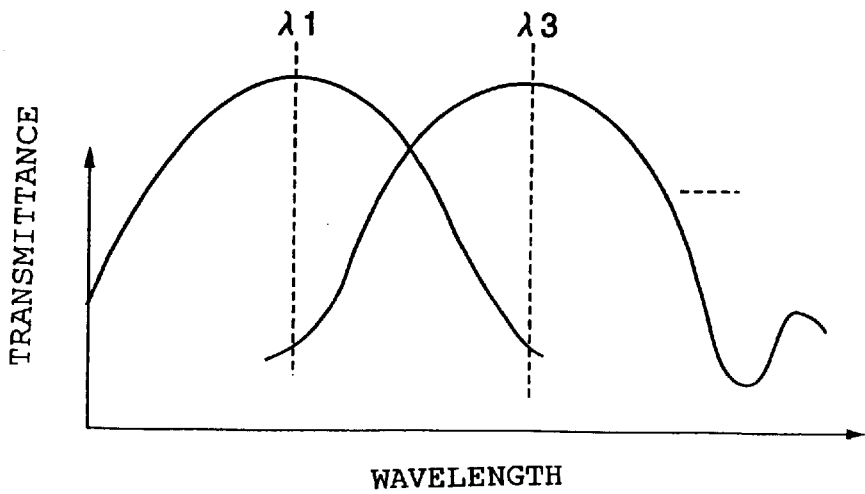

The conventional arrayed waveguide grating type optical multiplexer/demultiplexer, whose optical transmitting wavelength characteristics are shown, for example in FIG. 8C, multiplexes lights each having a different wavelength (for example, $\lambda 1, \lambda 3, \lambda 5 \ldots$) from each other by a predetermined design wavelength spacing and demultiplexes a plurality of lights each having a different wavelength (e.g. $\lambda 1, \lambda 3, \lambda 5 \ldots$) from each other. The optical transmitting wavelength characteristics of this arrayed waveguide grating type optical multiplexer/demultiplexer have a large overlap of spectrum centered around each center of the light transmitting wavelength so that it is difficult to improve the adjacent crosstalk.

On the other hand, according to one embodiment of the present invention, inputting light which has undergone wavelength division multiplexing having a plurality of wavelengths (e.g. $\lambda 1, \lambda 3, \lambda 5 \ldots$) different from each other by approximately the integral multiple spacing of the design wavelength spacing into the arrayed waveguide grating type optical multiplexer/demultiplexer (the design wavelength spacing; $\lambda 1, \lambda 2, \lambda 3 \ldots$) having the optical transmitting wavelength characteristics shown in FIG. 8A and demultiplexing the light into a plurality of lights each having a wavelength different from each other by approximately the integral multiple spacing of the design wavelength spacing, the optical transmitting wavelength characteristics are then obtained as shown in FIG. 8B. In short, the overlap of the spectrum centered around each center of the optical transmitting wavelength is small and the improvement of the adjacent crosstalk is easier compared to the case of demultiplexing the same light which has undergone wavelength division multiplexing ($\lambda 1, \lambda 3, \lambda 5 \ldots$) inputted to the arrayed waveguide grating type optical multiplexer/demultiplexer having the optical transmitting wavelength characteristics as shown in FIG. 8C.

In other words, a arrayed waveguide grating type optical multiplexer/demultiplexer having the optical multiplex/demultiplex function of the optical frequency spacing, for example, 100 GHz is designed and a multiplexed light of a plurality of different wavelengths of the optical frequency spacing, for example, 200 GHz, from each other is inputted to be demultiplexed into a plurality of lights each having a wavelength of the optical frequency spacing 200 GHz from each other. A design is adopted in which an optical output waveguide capable of demultiplexing a plurality of lights each different from each other by 100 GHz spacing is arranged and the optical output waveguide capable of demultiplexing a plurality of lights each different from each other by 200 GHz spacing is used or the optical output waveguide is arranged at their position. Thereby, the crosstalk between the adjacent wavelength (i.e. ±0.2 nm from the adjacent wavelength) is within the range of background crosstalk (a crosstalk of each wavelength being within ±½ FSR beyond ±1.6 nm from the central wavelength) so that the crosstalk is made stable.

Additionally, as described above, in the arrayed waveguide grating type optical multiplexer/demultiplexer, the optical transmitting wavelength (aforementioned wavelength multiplexed or demultiplexed) changes according to the change in the outside environmental temperature. Therefore, in general, it is difficult to improve the characteristics (radical change of loss, deterioration of adjacent crosstalk) due to the shift of the central wavelength, shift of the aforementioned optical transmitting wavelength (central wavelength shift of the optical transmitting wavelength) unless introducing temperature control or the like, and it is still difficult to improve the characteristics even though the aforementioned design is employed. Hence, if in addition to the aforementioned design, the transmitting spectrum of the arrayed waveguide grating type optical multiplexer/demultiplexer is made to have within its bandwidth a wide and flat leveled area in both of the long wavelength side and the short wavelength side of the central light transmitting wavelength such that the central wavelength shift due to the change in the temperature can be absorbed, the deterioration of the characteristics due to the central wavelength shift can be improved. Thus, even in case that the central wavelength of the transmitting light is shifted due to the change in the outside environmental temperature, because the shift is included within the flat leveled area of the wide bandwidth, the arrayed waveguide grating type optical multiplexer/demultiplexer can work regardless of the outside environmental temperature change.

Because the arrayed waveguide grating type optical multiplexer/demultiplexer as an embodiment of the present invention changes the optical amplitude distribution of the light propagating toward the slab waveguide side from the input waveguide side from the Gaussian shape into an approximately rectangular shape, the optical amplitude distribution of the light inputted onto the first slab waveguide from the optical input waveguide side can be made approximately rectangular shape at the light input surface of the first slab waveguide. Thus, the light transmitting spectrum of the arrayed waveguide grating type optical multiplexer/demultiplexer can be made, for example as shown in FIG. 2B, to have an enlarged width of flat leveled area and moreover a good (steep) rising edge in the foot part of the spectrum.

Besides, hereby, the evenness of the central wavelength is improved and also the adjacent crosstalk can further be improved and it becomes possible to work the arrayed waveguide grating type optical multiplexer/demultiplexer without hindrance even in the case that the central wavelength of the transmitting light is shifted to some extent due to the change in the outside environmental temperature.

Figure 2A:
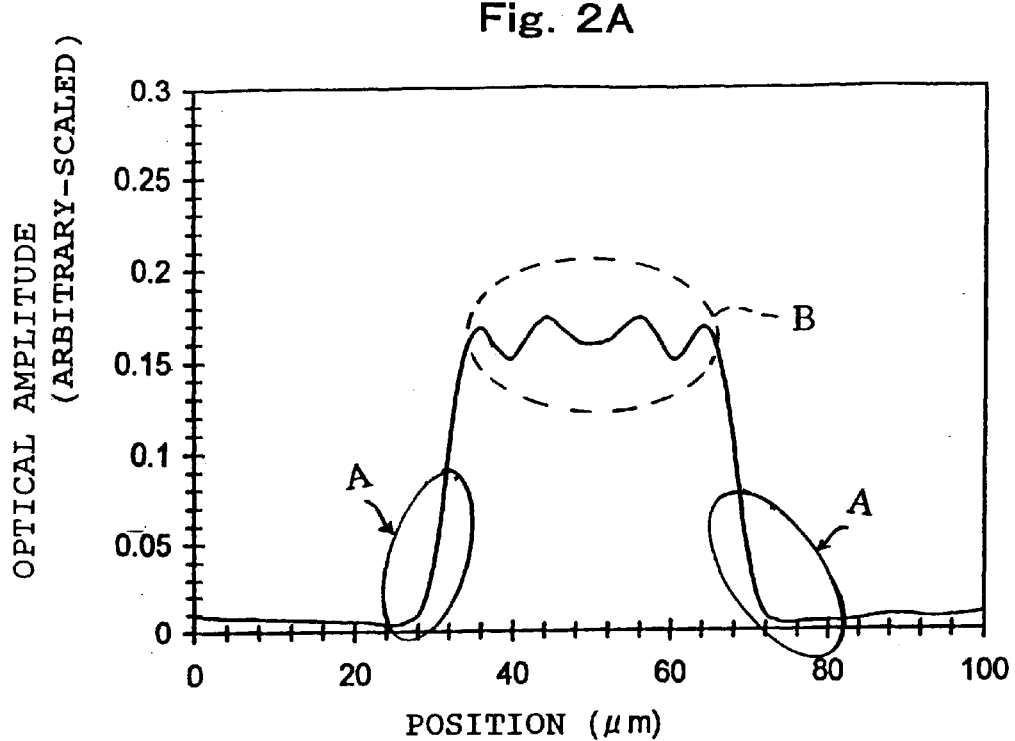
FIG. 2A is a graph showing the optical amplitude distribution of the light at the output of the speaker type waveguide in the arrayed waveguide grating type optical multiplexer/demultiplexer related to the first embodiment.
Figure 2B:
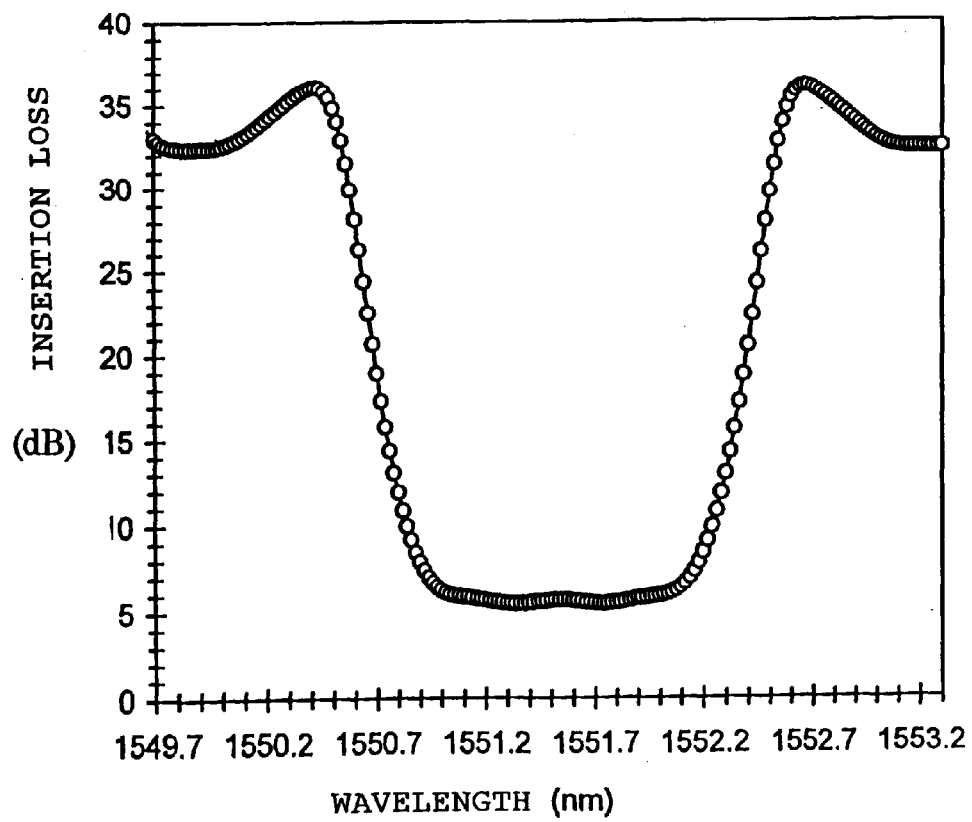
FIG. 2B is a graph showing the light transmitting characteristics of the arrayed waveguide grating type optical multiplexer/demultiplexer related to the first embodiment.
Figure 5:
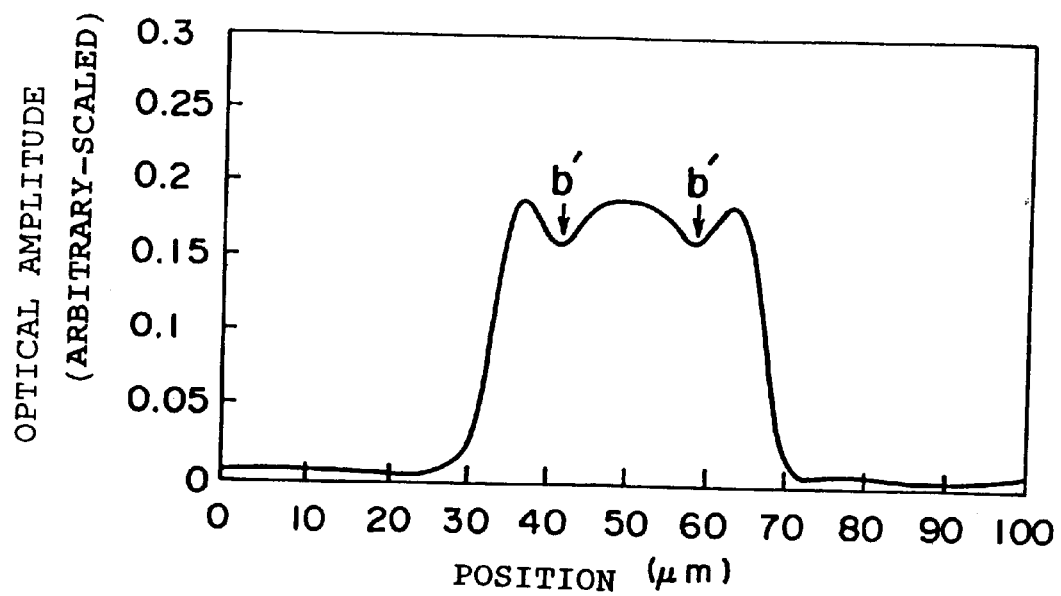
FIG. 5 is a graph showing the optical amplitude distribution at the output of the trapezoidal waveguide of the second embodiment.

Incidentally, in this specification, the approximately rectangular shape expresses, for example as shown in FIG. 2A, a shape in which the rising edge of the foot part (area A shown in the drawing) is good (the foot part has no gentle slope) and the summit area of the crest (area B as shown in the drawing) has a comparatively flat shape (including the one formed somewhat irregularly with the trough part e.g. b' as shown in FIG. 5).

In addition, in case of forming the aforementioned approximately rectangular optical amplitude distribution forming waveguide by a trapezoidal waveguide having a width larger than that of the corresponding optical input waveguide or optical output waveguide and enlarging its width increasingly toward the corresponding slab waveguide side, or providing at the narrower end of the trapezoidal waveguide a straight waveguide of equal width part having the same width as that of the narrower end, it is made possible to change the optical amplitude distribution of the light propagating toward the corresponding slab waveguide side from the optical input waveguide side or the optical output waveguide side from the Gaussian shape to the approximately rectangular shape. Incidentally, the details of these matters are described in Japanese Patent Application, the inventor of which is KASHIHARA and NARA same as this application (the application number: Japanese Patent Application No. 370602/1999, date of application: Dec. 27, 1999; the application number: Japanese Patent Application No. 58646/2000, date of application: Mar. 3, 2000; the application number: Japanese Patent Application No. 102473/2000, date of application: Apr. 4, 2000; Japanese Patent Application No. 285448/2000, date of application; Dec. 20, 2000).

In addition, with the consideration of the aforementioned Japanese Patent Applications, it is also recognized that by forming the optical amplitude distribution of the light incident onto the corresponding slab waveguide from the optical input waveguide side or the optical output waveguide side approximately rectangular shape, the evenness of the transmitting spectrum is improved as described above to enlarge the 1 dB bandwidth and it becomes possible to provide a arrayed waveguide grating type optical multiplexer/demultiplexer having a low adjacent crosstalk.

Therefore, according to the arrayed waveguide grating type optical multiplexer/demultiplexer as an embodiment of the present invention, a arrayed waveguide grating type optical multiplexer/demultiplexer can be constructed in which the 1 dB bandwidth of the transmitting spectrum is wider and the crosstalk is lower in comparison with the conventional and general arrayed waveguide grating type optical multiplexer/demultiplexer. Hence, in addition to the effect of enabling the adjacent crosstalk to be improved to the stable and small one, an effect can be obtained for enabling an optical multiplexing or demultiplexing the lights of desired wavelength with stability without depending on the outside environmental temperature. By applying this arrayed waveguide grating type optical multiplexer/demultiplexer to the design of a arrayed waveguide grating type optical multiplexer/demultiplexer related to the present invention, the crosstalk is made stable to a greater extent and the optical multiplexing or demultiplexing of the desired lights is made possible with further stability without depending on the outside environmental temperature.

Figure 1A:
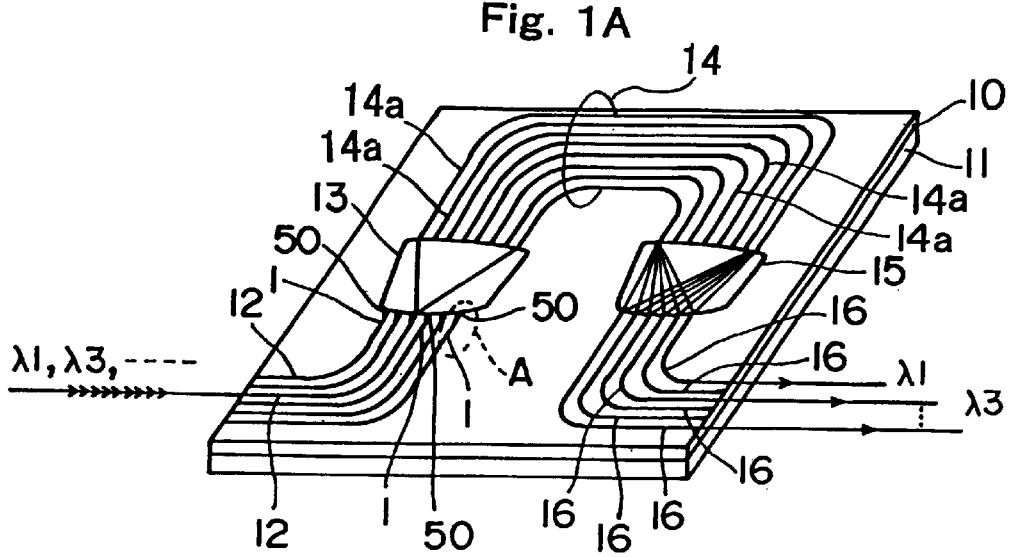
FIG. 1A is a block diagram of the arrayed waveguide grating type optical multiplexer/demultiplexer related to the first embodiment according to the present invention.
Figure 1B:
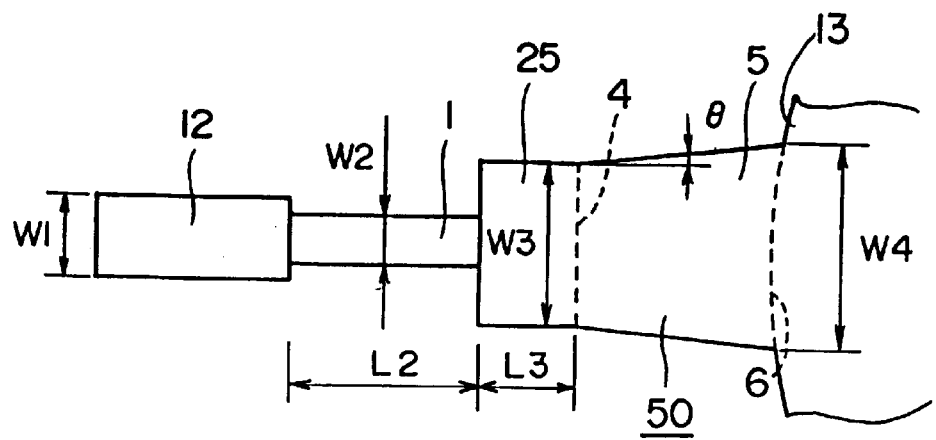
FIG. 1B is an enlarged illustration of the area A part of the FIG. 1A.
Figure 7A:
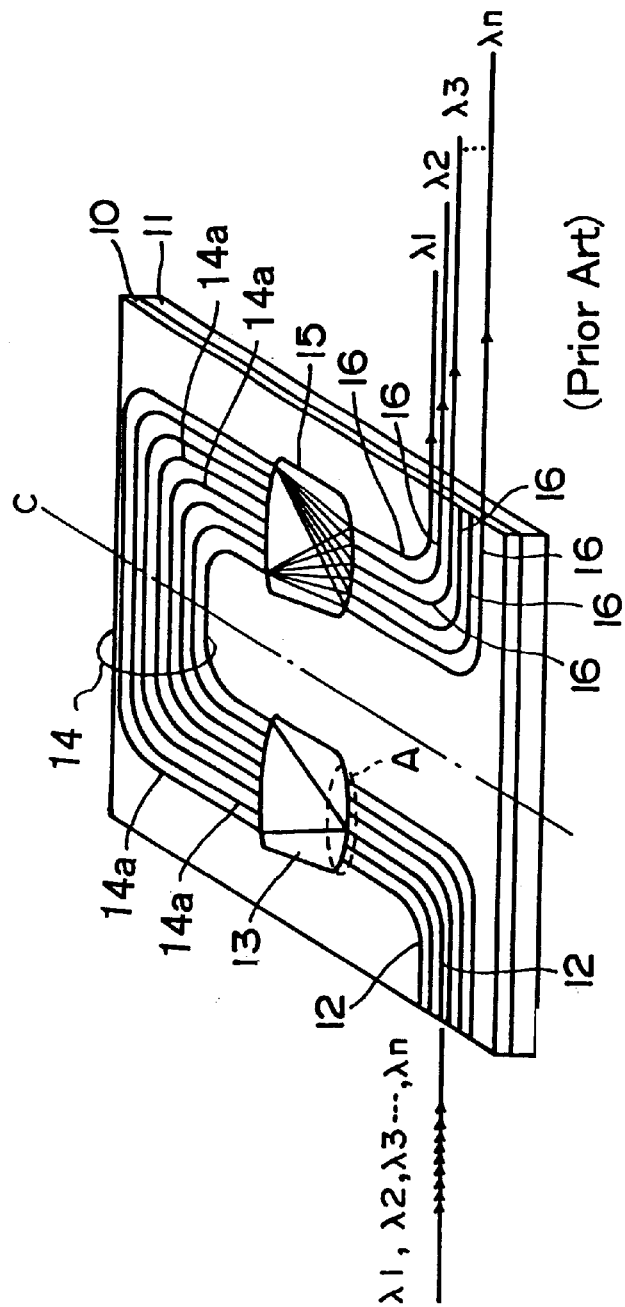
FIG. 7A is an illustration showing the structure of the conventional arrayed waveguide grating type optical multiplexer/demultiplexer.
Figure 7B:
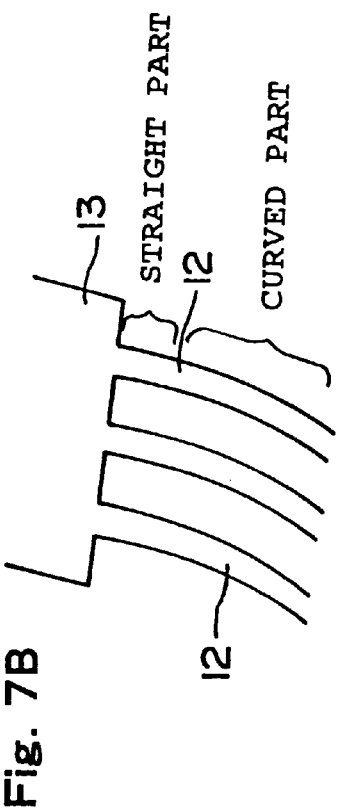
FIG. 7B is an illustration showing the enlarged area A part of the FIG. 7A.

The embodiment that gives a more concrete form of the present invention will now be explained with reference to the drawings. Incidentally, in the following description of the embodiment, the part having a common designation with that of the prior art shown in FIGS. 7A, 7B is denoted by the same reference numeral and their overlaps in the explanation are omitted or abbreviated. In FIG. 1A, a construction of the arrayed waveguide grating type optical multiplexer/demultiplexer related to the first embodiment of the invention is illustrated schematically, and in FIG. 1B is illustrated the enlarged view of the area A encircled by dotted line shown in FIG. 1A.

The arrayed waveguide grating type optical multiplexer/demultiplexer related to the first embodiment illustrated in FIG. 1A is constructed almost in similar configuration with the arrayed waveguide grating type optical multiplexer/demultiplexer shown in FIG. 7A but the first different point from the prior art is that a trapezoidal wavelength 5 having a larger width than that of the optical input waveguide 12 and enlarging its width increasingly toward the corresponding (connection couple) slab waveguide (first slab waveguide 13) side is connected to the output ends of each optical input waveguide 12. The second difference from the prior art is that the narrower end of the trapezoidal shape waveguide 5 is provided with a straight waveguide of equal width part 25 having the same width as the narrower end. Hereinafter, the waveguide provided with the aforementioned straight waveguide of equal width part 25 at the trapezoidal waveguide 5 is referred to as a speaker type waveguide 50. The third difference from the prior art is that a narrow straight waveguide 1 having a narrower width than that of the optical input waveguide 12 is connected between the speaker type waveguide 50 and the optical input waveguide 12.

In the first embodiment, the speaker type waveguide 50 works as an approximately rectangular shape optical amplitude distribution forming waveguide that changes the optical amplitude distribution of the light propagating toward the first slab waveguide 13 side from each optical input waveguide 12 side from a Gaussian shape to an approximately rectangular shape, and to be concrete, it is constructed as follows.

To be more specific, the speaker type waveguide 50 is constructed by providing a straight waveguide of equal width part 25 having the same width as that of the narrower end (W3) at the narrower end side (the side of upside 4) of the trapezoidal waveguide 5 that has a larger width than that of the aforementioned each optical input waveguide 12 (W1) and enlarges its width increasingly toward the first slab waveguide 13 side. The length of the straight waveguide of equal width part 25 is L3. In addition, the trapezoidal waveguide 5 enlarges its width by an angle θ and the base 6 of the trapezoidal waveguide 5 is slightly curved and the width of this base 6 is W4.

Additionally, the center of each narrow straight waveguide 1 is aligned with the lateral center of the input end of the corresponding straight waveguide of equal width part 25. Each aforementioned narrow straight waveguide 1 composes light power center position adjusting means that moves the power center of the light signal propagated through the optical input waveguide 12 connected to each narrow straight waveguide 1 to the lateral center thereof so as to input the power center of the light signal onto the lateral center of the light incident end of the straight waveguide of equal width part 25. The width of the narrow straight waveguide 1 is W2 and its length is L2.

In the first embodiment, the aforementioned parameters are set as follows. That is, the width W1 of the optical input waveguide 12 is 6.5 μm, the width W2 of the narrow straight waveguide 1 is 3.0 μm, the length L2 of the narrow straight waveguide is 500 μm, the width W3 of the straight waveguide of equal width part 25 (width of the narrower end of the speaker type waveguide 50) is 24.5 μm, the length L3 of the straight waveguide of equal width part 25 is 250 μm, the angle θ is 0.4° and the width W4 of the base of the trapezoidal waveguide 5 (width of the wider end of the speaker type waveguide 50) is 37.9 μm. In addition, the height of the core forming each waveguide is 6.5 μm and the relative refractive index difference Δ between the core and the cladding of each waveguide is 0.8%.

The first embodiment has such waveguide construction as described above. The arrayed waveguide grating type optical multiplexer/demultiplexer of the first embodiment has optical demultiplex and multiplex functions. The optical demultiplex function is one that demultiplex a light having a plurality of wavelengths different from each other inputted through aforementioned optical input waveguides 12 into a plurality of lights each having a wavelength different from each other by 100 GHz (about 0.8 nm) as a predetermined design wavelength spacing are generated, thereby to output them. The optical multiplex function is a function to multiplex the plurality of lights each having a wavelength different from each other by the aforementioned wavelength spacing inputted from the aforementioned each optical output waveguide 16, thereby outputting it from the aforementioned optical input waveguide 12.

Further, the fourth difference between the prior art is that an arrayed waveguide grating type optical multiplexer/demultiplexer related to the first embodiment is designed such that a light having a plurality of different wavelengths from each other by a double frequency spacing (200 GHz: about 1.6 nm), the integral multiple spacing of the aforementioned design wavelength spacing is inputted and demultiplexed to a plurality of lights each having a different wavelength from each other by the double wavelength spacing (200 GHz) thereby being outputted. Alternatively, the arrayed waveguide grating type optical multiplexer/demultiplexer may be designed such that a plurality of lights each having a wavelength different from each other by the double frequency spacing are inputted from each optical output waveguide and the plurality of lights each having respective wavelength are multiplexed thereby being outputted.

Incidentally, on determining the construction and the design of the arrayed waveguide grating type optical multiplexer/demultiplexer, the following consideration was taken into account. To be more specific, for example, it is contemplated that the crosstalk at the adjacent wavelength (i.e. ±0.2 nm from the adjacent wavelength) can be set within the background crosstalk (a crosstalk of each wavelength within ±½ FSR beyond ±1.6 nm from the central wavelength) and the stable crosstalk can be obtained by designing, for example like in the first embodiment, an arrayed waveguide grating type optical multiplexer/demultiplexer having an optical multiplex/demultiplex function of the optical frequency spacing 100 GHz and inputting a multiplexed light of plural wavelengths different from each other of the optical frequency spacing 200 GHz and demultiplexing it into the plural lights each having a wavelength different from each other of the optical frequency spacing 200 GHz.

In addition, in order to realize a high quality wavelength division multiplexing communications by working the arrayed waveguide grating type optical multiplexer/demultiplexer without causing a problem, even if the central wavelength of the transmitting light is slightly shifted due to the change in the outside environmental temperature, it is necessary to improve the evenness of the central wavelength within the transmitting spectrum of the arrayed waveguide grating type optical multiplexer/demultiplexer, therefore it is required to enlarge the 1 dB bandwidth as wide as capable of absorbing the central wavelength shift due to the change in the outside environmental temperature.

Furthermore, in consideration of improving the adjacent crosstalk, it is also required to improve (steepen) the rising edge of the foot part of the transmitting spectrum waveform of the arrayed waveguide grating type optical multiplexer/demultiplexer.

Hence, as is obvious from the description of the aforementioned Japanese Patent Applications (Japanese Patent Application No. 370602/1999, Japanese Patent Application No. 102473/2000 and Japanese Patent Application No. 285448/2000), by providing the speaker type waveguide 50 of the aforementioned construction at the output ends of the optical input waveguides 12, the optical amplitude distribution of the light toward the first slab waveguide 13 side is changed from the Gaussian shape to the approximately rectangular shape, thereby enlarging the 1 dB bandwidth and improving the rising edge of the foot part of the transmitting spectrum waveform having a central wavelength of the transmitting light of the arrayed waveguide grating type optical multiplexer/demultiplexer. Thus, in addition to the construction of the arrayed waveguide grating type optical multiplexer/demultiplexer, the aforementioned design of the present invention is applied.

To be concrete, the arrayed waveguide grating type optical multiplexer/demultiplexer related to the first embodiment is designed in a manner as described below. To be more specific, the central wavelength of the transmitting light of the arrayed waveguide grating type optical multiplexer/demultiplexer within the working temperature is made to agree approximately with, for example, the ITU grid wavelength as the set wavelength. Therefore, first of all, the central wavelength of the transmitting light is designed to agree with the ITU grid wavelength at 35° C., which is the central temperature of the working temperature (0° C. to 70° C.) for arrayed waveguide grating type optical multiplexer/demultiplexer.

In addition, considering the temperature dependence (0.011 nm/° C.) of the central wavelength of the transmitting light of the arrayed waveguide grating type optical multiplexer/demultiplexer, as the shift amount of the central wavelength of the transmitting light is 0.77 nm under the temperature of 0 to 70° C., nothing matters if the passband of the central wavelength of the transmitting light is wider than the variation of the central wavelength due to the temperature dependence. Hence, as the 1 dB bandwidth required by the wavelength division multiplexing communications system side is about 0.3 nm, and because 1.1 nm is obtained by adding 0.3 nm to 0.77 nm as the shift amount of the central wavelength of the aforementioned transmitting light, the arrayed waveguide grating type optical multiplexer/demultiplexer is designed such that the 1 dB bandwidth is approximately equal to or more than 1.1 nm.

In addition, the adjacent crosstalk in case of multiplexing or demultiplexing the optical frequency spacing 200 GHz is usually defined as the worst crosstalk within the range of the adjacent wavelength, (in case of this embodiment; ±1.6 nm±0.2 nm from the central wavelength). Therefore, considering the temperature dependence of the central wavelength of the transmitting light (shift amount of the central wavelength of the transmitting light), the arrayed waveguide grating type optical multiplexer/demultiplexer is designed such that the worst crosstalk within the wavelength range of ±1.6 nm±0.6 nm having been added further 0.77 nm/2= 0.385 nm becomes equal to or less than minus 26 dB of the adjacent crosstalk required by the wavelength division multiplexing communications system side.

As the result, the arrayed waveguide grating type optical multiplexer/demultiplexer of the first embodiment has the aforementioned waveguide construction in which each parameter is formed as described above, and as shown in for example FIG. 2B, the arrayed waveguide grating type optical multiplexer/demultiplexer is constructed in which the 1 dB bandwidth is 1.14 nm, the ripple is 0.2 dB, the crosstalk (in this case, the worst crosstalk measured within the range of the wavelength of 1.6±0.6 nm from the central wavelength of the transmitting light) is minus 27 dB.

According to the first embodiment, by designing the wavelength spacing of the lights multiplexed or demultiplexed by the arrayed waveguide grating type optical multiplexer/demultiplexer to be 100 GHz, setting the wavelength spacing of the inputted lights 200 GHz and providing the speaker type waveguide 50 at the output end of each optical input waveguide 12, the evenness of the transmitting spectrum of the arrayed waveguide grating type optical multiplexer/demultiplexer is improved and a sufficient isolation can be achieved even if the central wavelength of the transmitting light shifts to some extent due to the outside environmental temperature of the arrayed waveguide grating type optical multiplexer/demultiplexer. In addition, the wavelength spacing of the light multiplexed or demultiplexed by the arrayed waveguide grating type optical multiplexer/demultiplexer is designed 100 GHz while the wavelength spacing of the inputted light being 200 GHz. As the result, it is made possible to perform an optical multiplexing/demultiplexing of the lights of the ITU grid wavelength with stability without depending on the outside environmental temperature and also to improve the adjacent crosstalk of the arrayed waveguide grating type optical multiplexer/demultiplexer securely enabling a high quality wavelength division multiplexing communications.

Figure 3:
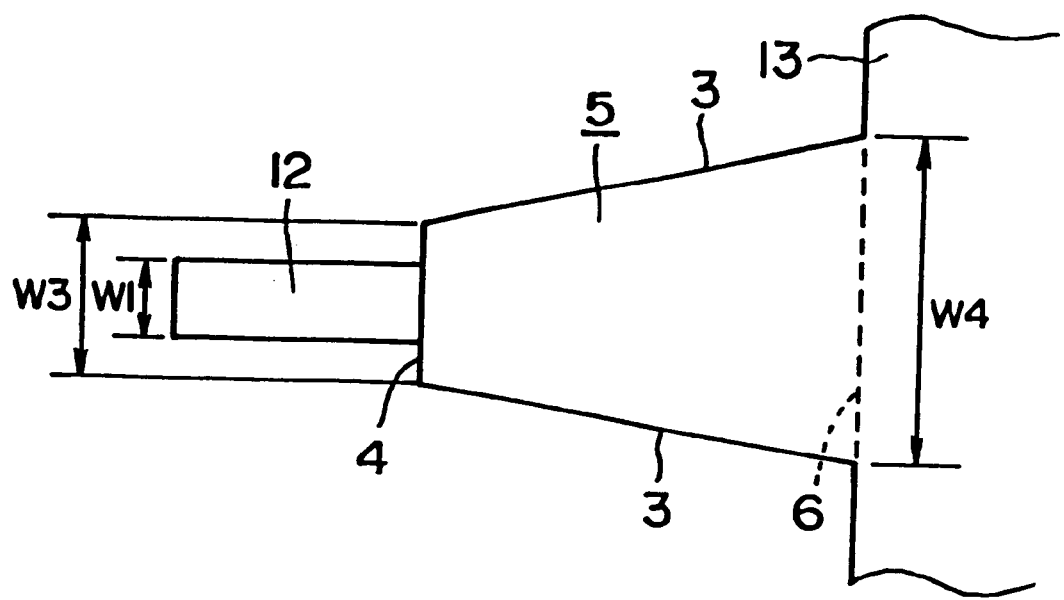
FIG. 3 is a block diagram showing the output end of the optical input waveguide of the arrayed waveguide grating type optical multiplexer/demultiplexer related to the second embodiment according to the present invention.

Next, an arrayed waveguide grating type optical multiplexer/demultiplexer related to the second embodiment according to the present invention is described. Incidentally, in the explanation of the second embodiment, the description overlapping with the aforementioned first embodiment is omitted. In FIG. 3, a connection structure between the output ends of optical input waveguides 12 in the arrayed waveguide grating type optical multiplexer/demultiplexer related to the second embodiment and the first slab waveguide 13 is illustrated. The first embodiment and the second embodiment differ in the connection structure but in the rest of the structure the second embodiment is almost the same as the first embodiment. The second embodiment differs with the first embodiment in that the narrow straight waveguide 1 and the straight waveguide of equal width part 25 of the speaker type waveguide 50 provided in the first embodiment are omitted and the trapezoidal waveguide 5 is connected as an approximately rectangular optical amplitude distribution forming waveguide directly to the light output ends of the optical input waveguides 12.

In the second embodiment, the optical input waveguides 12 is designed for the center position of the intensity of the light propagating through the optical input waveguides 12 not to shift from the lateral center of the optical input waveguides 12. Therefore, even though the narrow straight waveguide 1 provided in the aforementioned first embodiment is omitted, the center position of the intensity of the light propagating through the optical input waveguides 12 is shot to the lateral center of the narrow end (upside 4) of the trapezoidal waveguide 5.

In addition, the speaker type waveguide 50 and the trapezoidal waveguide 5 are almost the same with respect to their function and consequently the optical amplitude distribution of the light can be changed adequately by the trapezoidal waveguide 5. Therefore, according to the arrayed waveguide grating type optical multiplexer/demultiplexer of the second embodiment, the evenness of the central wavelength of the transmitting light can be improved like the aforementioned first embodiment.

Figure 4:
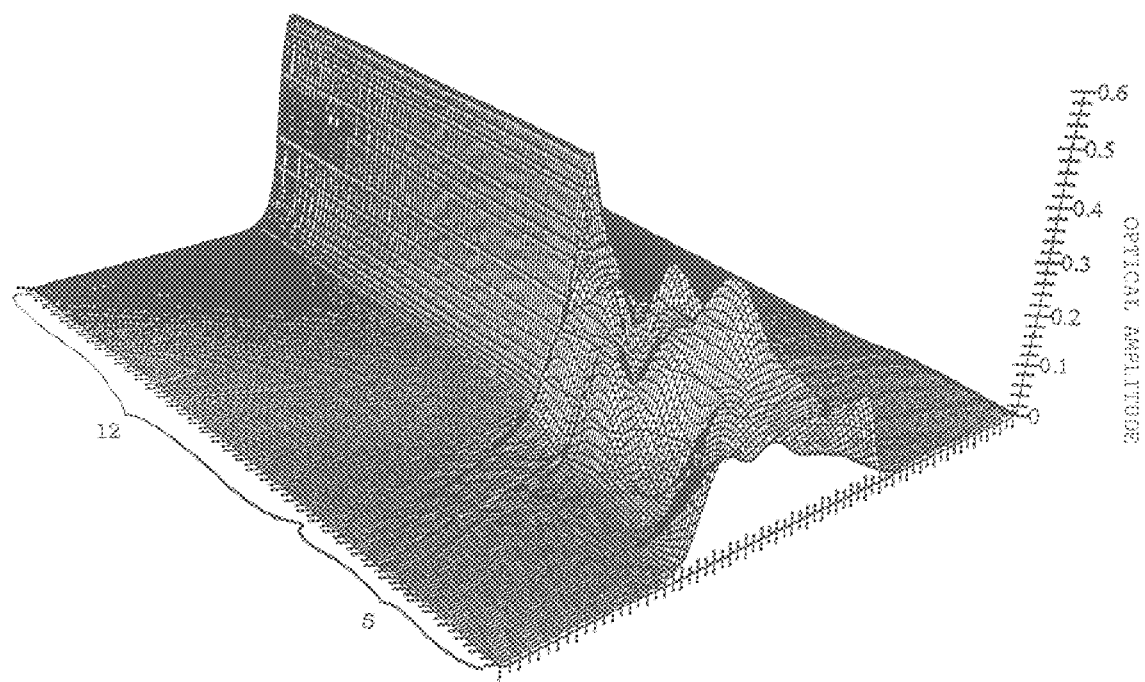
FIG. 4 is an illustration showing in three dimension of the optical amplitude distribution of light propagating through the optical input waveguide and the trapezoidal waveguide in the second embodiment.

To be more specific, in the second embodiment as shown in FIG. 4, the light passing through the optical input waveguide 12 has the optical amplitude distribution of a Gaussian shape. In addition, the light is shot to the trapezoidal waveguide 5 and the light propagates changing its optical amplitude distribution within the trapezoidal waveguide 5. On that occasion, the foot part of the optical amplitude distribution of the light is cut down as the light propagates, and the light as a whole propagates expanding its distribution width to form an approximately rectangular shape. Then, it forms a shape shown in FIG. 5 at the light output end (base 6) of the trapezoidal waveguide 5 so that the evenness of the central wavelength of the transmitting light can be improved like the aforementioned first embodiment.

In the second embodiment, parameters forming the waveguide construction of the arrayed waveguide grating type optical multiplexer/demultiplexer are as follows. That is, the width W1 of the optical input waveguide 12 is 6.5 $\mu$m, the width W3 of the narrow end of the trapezoidal waveguide 5 is 22.5 $\mu$m, the angle $\theta$ is 0.3°, and the width W4 of the base 6 of the trapezoidal waveguide 5 is 61.5 $\mu$m. In addition, the height of the core forming each waveguide and the relative refractive index difference are the same as those of the first embodiment.

The second embodiment is also designed in almost the same manner as the arrayed waveguide grating type optical multiplexer/demultiplexer related to the first embodiment.

As the result, almost same effect can be obtained by the second embodiment by means of the similar operation with the aforementioned first embodiment.

Five units of the arrayed waveguide grating type optical multiplexer/demultiplexer (samples 1 to 5) related to the second embodiment composed as above are produced and the light which has undergone wavelength division multiplexing having a plurality of wavelengths different from each other by 200 GHz at the band of wavelength 1.55 $\mu$m is inputted from the optical input waveguide 12 and the crosstalk and the 1 dB bandwidth of the light outputted from the arrayed waveguide grating type optical multiplexer/demultiplexer are evaluated thereby having obtained a result shown in Table 1. Incidentally, the adjacent crosstalk in Table 1 shows the result determined as the worst crosstalk within the range of adjacent wavelength of ±1.6±0.6 nm from the central wavelength.

TABLE 1

|  | 1 dB bandwidth (nm) | adjacent crosstalk (dB) |
| --- | --- | --- |
| sample 1 | 1.12 | −31 |
| sample 2 | 1.10 | −33 |
| sample 3 | 1.11 | −32 |
| sample 4 | 1.13 | −34 |
| sample 5 | 1.10 | −32 |

Consequently, it has been identified that the arrayed waveguide grating type optical multiplexer/demultiplexer related to the second embodiment has a same 1 dB bandwidth and remarkably superior and stable adjacent crosstalk in comparison with the arrayed waveguide grating type optical multiplexer/demultiplexer having an optical multiplex/demultiplex function of the optical frequency spacing 200 GHz at the 1.55 $\mu$m band.

Incidentally, the present invention is not restricted to the aforementioned each embodiment and various embodiments are available. For example, in the aforementioned embodiment, all the output ends of each optical input waveguide 12 are provided with the speaker type waveguide 50 or the trapezoidal waveguide 5, however, one or more optical input waveguides may be provided with the speaker type waveguide 50 or the trapezoidal waveguide 5. In addition, a trapezoidal waveguide expanding its width toward the second slab waveguide 15 or a speaker type waveguide having the trapezoidal waveguide concerned may be connected to the light input side of one or more optical output waveguides 16. Alternatively, a trapezoidal waveguide or a speaker type waveguide may be provided at both of the output ends of one or more optical input waveguides 12 and the input ends of one or more optical output waveguides 16.

In case of providing a trapezoidal waveguide or a speaker type waveguide at the optical output waveguide 16 side, the width of the trapezoidal waveguide or the speaker type waveguide is made wider than that of the optical output waveguides 16.

Figure 6A:
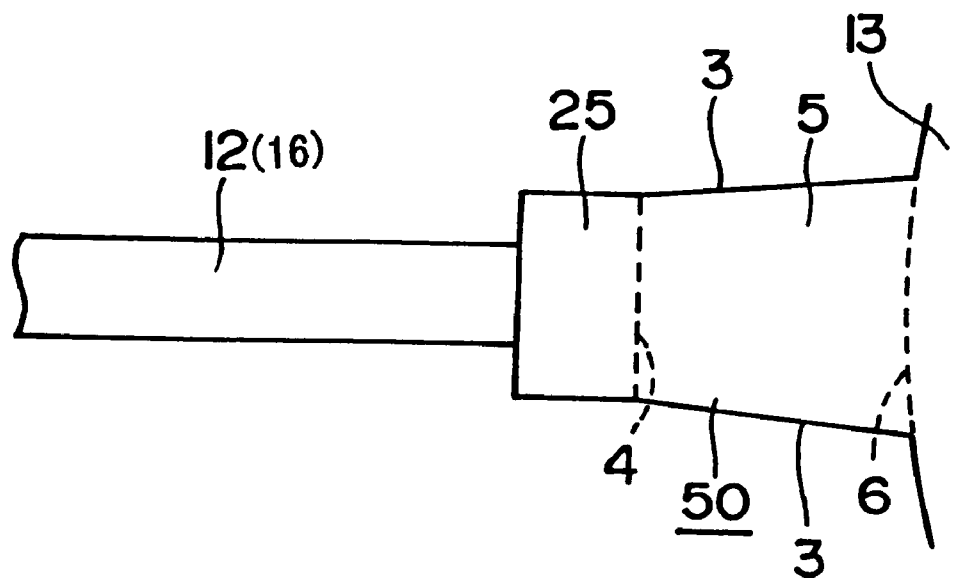
FIGS. 6A, 6B are illustrations showing a structural example of connecting part of an optical input waveguide and a first slab waveguide in the arrayed waveguide grating type optical multiplexer/demultiplexer related to another embodiment according to the present invention.

In addition, in the aforementioned first embodiment, the narrow straight waveguide 1 is interposed between the speaker type waveguide 50 and the optical input waveguide 12 but the speaker type waveguides 50 may be connected directly to the output ends of the optical input waveguides 12 or the input ends of the optical output waveguides 16 as shown in FIG. 6A.

Figure 6B:
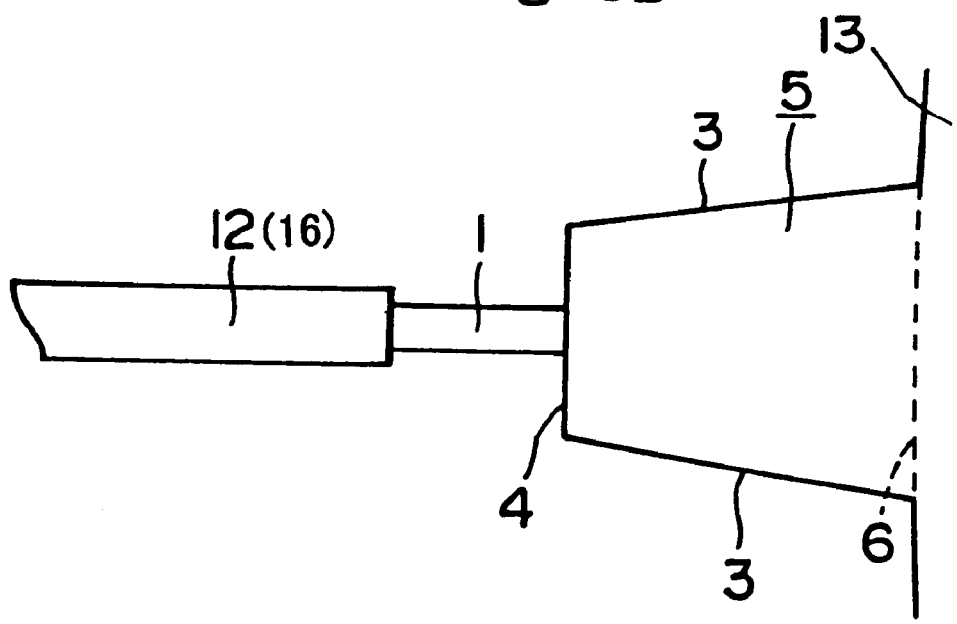

Further, in the second embodiment, the trapezoidal waveguides 5 are directly connected to the output ends of the optical input waveguides 12 but as shown in FIG. 6B, the narrow straight waveguide 1 may be connected between the optical input waveguides 12 and the trapezoidal waveguides 5 or the narrow straight waveguides 1 can be connected between the optical output waveguides 16 and the trapezoidal waveguides 5 even in the case of providing the trapezoidal waveguides 5 at the input ends of the optical output waveguides 16.

Further, in the arrayed waveguide grating type optical multiplexer/demultiplexer according to the present invention, the width, the length or the angle of the trapezoidal waveguide, the length or the width of the narrow straight waveguide, or the width or the length of the straight waveguide of equal width part are not limited in particular and they can be determined suitably. For example, by setting aforementioned each value according to the specifications of the arrayed waveguide grating type optical multiplexer/demultiplexer, based on a simulation result of the optical amplitude distribution such as shown for example in FIG. 4, an arrayed waveguide grating type optical multiplexer/demultiplexer having the advantageous effects like the aforementioned each embodiment can be obtained.

Further, in the above each embodiment, each optical output waveguide 16 is formed at a position enabling the output of a plurality of lights each having a different wavelength from each other by the design wavelength spacing so as to demultiplex the light which has undergone wavelength division multiplexing inputted from one of the optical input waveguides 12 into a plurality of lights each having a wavelength of the optical frequency spacing from each other by a predetermined design wavelength spacing thereby being outputted from each optical output waveguides 16, however, the optical output waveguides 16 may be formed at a position where only the light having a wavelength of approximately integral multiple spacing of the aforementioned design wavelength spacing (e.g. every other waveguide in case of outputting the light of double wavelength spacing of the design wavelength spacing like the aforementioned embodiment) can be outputted.

According to the arrayed waveguide grating type optical multiplexer/demultiplexer as one example of the present invention, by means of the arrayed waveguide grating type optical multiplexer/demultiplexer capable of optical multiplexing or demultiplexing the lights of the optical frequency spacing by the design wavelength spacing, a plurality of lights each having a wavelength different from each other by an integral multiple spacing of the design wavelength spacing are multiplexed or demultiplexed. Accordingly, the effect of reducing the adjacent crosstalk can be improved in comparison with the case in which lights each having a wavelength different from each other by the design wavelength spacing are multiplexed or demultiplexed by means of the arrayed waveguide grating type optical multiplexer/demultiplexer that performs optical multiplexing or demultiplexing by the design wavelength spacing.

Further, according to the arrayed waveguide grating type optical multiplexer/demultiplexer related to the present invention, the evenness of the central wavelength of the transmitting light of the arrayed waveguide grating type optical multiplexer/demultiplexer is improved such that the shift of the central wavelength due to the aforementioned temperature change can be absorbed and moreover the adjacent crosstalk can be improved. Therefore, by applying the design of the aforementioned arrayed waveguide grating type optical multiplexer/demultiplexer related to the present invention, the arrayed waveguide grating type optical multiplexer/demultiplexer can be functioned without causing a problem, even if the central wavelength of the transmitting light is shifted to some extent, so that a high quality optical wavelength division multiplexing communications can be realized.

Furthermore, in the arrayed waveguide grating type optical multiplexer/demultiplexer as one embodiment according to the present invention, by forming the approximately rectangular optical amplitude distribution forming waveguide by means of a trapezoidal waveguide having a width larger than that of the corresponding optical input waveguide or optical output waveguide and enlarging its width increasingly toward the corresponding slab waveguide, or by means of a straight waveguide of equal width part provided at the narrower end of the trapezoidal waveguide and having the same width as that of the narrower end, the optical amplitude distribution of the light propagating toward the corresponding slab waveguide can be changed from the Gaussian shape into the approximately rectangular shape so that the aforementioned effect can be securely achieved.

Further, in the arrayed waveguide grating type optical multiplexer/demultiplexer according to the present invention, a construction in which a narrow straight waveguide having a width narrower than that of the corresponding optical input waveguide or optical output waveguide is provided between the approximately rectangular optical amplitude distribution forming waveguide and the optical input waveguide or the optical output waveguide corresponding thereto, even in the case that the optical input waveguide or the optical output waveguide is provided with a curved part and that the center position of the light intensity distribution is shifted from the lateral center of the optical input waveguide or the optical output waveguide as the light propagates through the curved part, the center position of the light intensity can be shot to the lateral center of the approximately rectangular optical amplitude distribution forming waveguide so that the light intensity distribution form of the light outputting from the approximately rectangular optical amplitude distribution forming waveguide can be made as a whole free from distortion.

What is claimed is:

1. An arrayed waveguide grating type optical multiplexer/demultiplexer comprising:

one or more optical input waveguides arranged side by side;

a first slab waveguide connected to the output ends of said optical input waveguides;

an arrayed waveguide consisting of a plurality of channel waveguides arranged side by side each having a length different from each other by a predetermined length and connected to the output end of said first slab waveguide;

a second slab waveguide connected to the output end of said arrayed waveguide; and a plurality of optical output waveguides arranged side by side connected to the output end of said second slab waveguide, said arrayed waveguide grating type optical multiplexer/demultiplexer having:

an optical demultiplex function to demultiplex a light having a plurality of wavelengths different from each other by a predetermined design wavelength spacing into a plurality of lights each having a wavelength different from each other; and an optical multiplex function to multiplex a plurality of lights each having a wavelength different from each other by a predetermined design wavelength spacing, in case of optical demultiplexing, a light having a plurality of wavelengths different from each other by approximately an integral multiple spacing of said design wavelength spacing is inputted into said optical input waveguide of the arrayed waveguide grating type optical multiplexer/demultiplexer and demultiplexed into a plurality of lights each having a wavelength different from each other to be outputted from the said optical output waveguides, in case of optical multiplexing, lights each having a wavelength different from each other by approximately an integral multiple spacing of said design wavelength spacing is inputted into each optical output waveguide of said arrayed waveguide grating type optical multiplexer/demultiplexer and each light of respective wavelength is multiplexed to be outputted from one of the optical input waveguides, wherein an approximately rectangular optical amplitude distribution forming waveguide is connected between at least either one of one or more optical input waveguides and one or more optical output waveguides and the slab waveguide as the connection couple, and said approximately rectangular optical amplitude distribution forming waveguide changes the optical amplitude distribution of the light propagating, from the optical input waveguide or the optical output waveguide toward the corresponding slab waveguide side, from a Gaussian shape into an approximately rectangular shape.

2. The arrayed waveguide grating type optical multiplexer/demultiplexer according to claim 1, wherein said approximately rectangular optical amplitude distribution forming waveguide is formed by means of a trapezoidal waveguide having a width larger than that of the optical input waveguide or the optical output waveguide to be connected and enlarging its width increasingly toward the corresponding slab waveguide side.

3. The arrayed waveguide grating type optical multiplexer/demultiplexer according to claim 1, wherein:

said approximately rectangular optical amplitude distribution forming waveguide is a trapezoidal waveguide having a width larger than that of the optical input waveguide or the optical output waveguide to be connected and enlarging its width increasingly toward the corresponding slab waveguide side; and at the narrower end of said trapezoidal waveguide is formed a straight waveguide of equal width part having the same width as said narrower end.

4. The arrayed waveguide grating type optical multiplexer/demultiplexer according to claim 1, wherein between the approximately rectangular optical amplitude distribution forming waveguide and the optical input waveguide or the optical output waveguide to be connected respectively, is provided a narrow straight waveguide having a width narrower than that of said optical input waveguide and said optical output waveguide.

5. The arrayed waveguide grating type optical multiplexer/demultiplexer according to claim 2, wherein between the approximately rectangular optical amplitude distribution forming waveguide and the optical input waveguide or the optical output waveguide to be connected respectively, is provided a narrow straight waveguide having a width narrower than that of said optical input waveguide and said optical output waveguide.

6. The arrayed waveguide grating type optical multiplexer/demultiplexer according to claim 3, wherein between the approximately rectangular optical amplitude distribution forming waveguide and the optical input waveguide or the optical output waveguide to be connected respectively, is provided a narrow straight waveguide having a width narrower than that of said optical input waveguide and said optical output waveguide.

* * * * *